United States Patent [19]

Orikasa et al.

[11] Patent Number: 4,736,007
[45] Date of Patent: Apr. 5, 1988

[54] NOVEL ETHYLENE COPOLYMERS

[75] Inventors: Yuichi Orikasa; Shinji Kojima; Takashi Inoue, all of Yokohama; Kaoru Yamamoto, Tokyo; Atsushi Sato, Tokyo; Shigenobu Kawakami, Ichikawa, all of Japan

[73] Assignee: Nippon Petrochemicals Co., Ltd., Japan

[21] Appl. No.: 935,939

[22] Filed: Nov. 28, 1986

Related U.S. Application Data

[63] Continuation-in-part of Ser. No. 782,311, Oct. 1, 1985, abandoned.

[30] Foreign Application Priority Data

Oct. 3, 1984 [JP] Japan .................. 59-207595

[51] Int. Cl.⁴ .................................. C08F 12/06
[52] U.S. Cl. ...................................... 526/347
[58] Field of Search .................................. 526/347

[56] References Cited

U.S. PATENT DOCUMENTS 3,741,947 6/1973 Schrott .................. 526/293

Primary Examiner—Paul R. Michl
Attorney, Agent, or Firm—Ostrolenk, Faber, Gerb & Soffen

[57] ABSTRACT

A novel ethylene copolymer useful for electric insulating materials is obtained by a high-pressure radical polymerization at a pressure of 500 to 4,000 kg/cm² at a temperature of 130° to 400° C. and which comprises 95.0 to 99.995 mol % of an ethylene unit, 0.005 to 2 mol % of a comonomer unit represented by the formula (I)

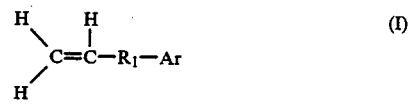

wherein Ar is

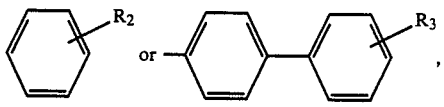

$R_1$ is an alkylene group having 1 or 2 carbon atoms, each of $R_2$ and $R_3$ is a hydrogen atom, or a straight-chain or a side-chain alkyl group having 1 to 4 carbon atoms, and 0 to 3 mol % of an ethylenic unsaturated monomer unit, said ethylene copolymer having a density of 0.910 to 0.940 g/cm³ and a melt index of 0.05 to 100 g/10 minutes.

7 Claims, 2 Drawing Sheets

NOVEL ETHYLENE COPOLYMERS

This is a continuation-in-part of application Ser. No. 782,311 filed Oct. 1, 1985, abandoned.

BACKGROUND OF THE INVENTION

1. Field of the Invention

The present invention relates to novel ethylene copolymers. More specifically, it relates to ethylene copolymers useful for electric insulating materials.

2. Description of the Prior Art

Olefin polymers, especially, ethylene polymers and propylene polymers are excellent in various properties such as mechanical properties, workability and electrical properties, and are inexpensive and thus economical. Consequently, they are utilized as raw materials for electrical insulating materials and foamed materials, or as finished products such as films, pipes and containers in a variety of field.

Further, there are well known olefin copolymers in which functional groups are introduced into the above-mentioned olefin polymers in order to improve their properties.

For example, polyethylene itself has a small dielectric loss and has a high insulating power, and when cross-linked so as to remarkably improve its thermal resistance, it is employed as a good insulating material. However, for the purpose of utilizing polyethylenes as insulating materials for high-voltage cables and high-voltage equipments, a more improved and more heightened performance is desired for the polyethylenes.

Attempts have been made to improve the insulating power, and a method has been suggested in which an aromatic ring is introduced into an ethylene polymer. For example, (1) A method in which an aromatic polymer such as a polystyrene is mixed with a polyethylene or an olefin polymer (Japanese patent publication No. 20717/1963, and Japanese patent Provisional publication Nos. 142651/1975 and 54187/1977).

(2) A method in which a polyethylene is mixed with a block copolymer of styrene and a conjugated diene (Japanese patent Provisional publication No. 41884/1975).

(3) A method in which a graft polymerization is carried out between a polyethylene and styrene (Japanese patent publication No. 18760/1979).

(4) A method in which a polyethylene is impregnated with an electrical insulating oil (Japanese patent Provisional publication No. 33938/1974).

However, even according to any method just described, sufficient improvement of the insulating power cannot be achieved. In addition thereto, as for the method of the paragraph (1) mentioned above, the miscibility of the polyethylene or the polyolefin and the styrene polymer is poor, and in the method of the paragraph (2) above, thermal resistance and extrusion workability are bad. In the case of the method described in the paragraph (3), the previously crosslinked polyethylene is graft-polymerized with styrene in order to improve destructive strength to impulse voltage in a high-temperature range of the polyethylene. In consequence, intricate equipment and processes are required, and there exists the drawback that the destructive strength to the impulse voltage in the low-temperature range is poorer than that of an untreated raw polyethylene. With regard to the method of the paragraph (4), the kneaded electrical insulating oil will be bled out when the polyethylene is used for a long period of time or when environments are changed, so that functional effects of the polyethylene will be poorer than by any other method. Accordingly, the methods are unsatisfactory, and thus the insulating materials are now demanded which are stable for a long period of time and which have an improved performance.

SUMMARY OF THE INVENTION

In view of the above-mentioned situations, the present invention has now been achieved as a result of intensive research, and its object is to provide novel ethylene copolymers capable of effectively improving performances necessary for electrical insulating material s, without involving conventional problems.

DETAILED DESCRIPTION OF THE INVENTION

Figure 1:
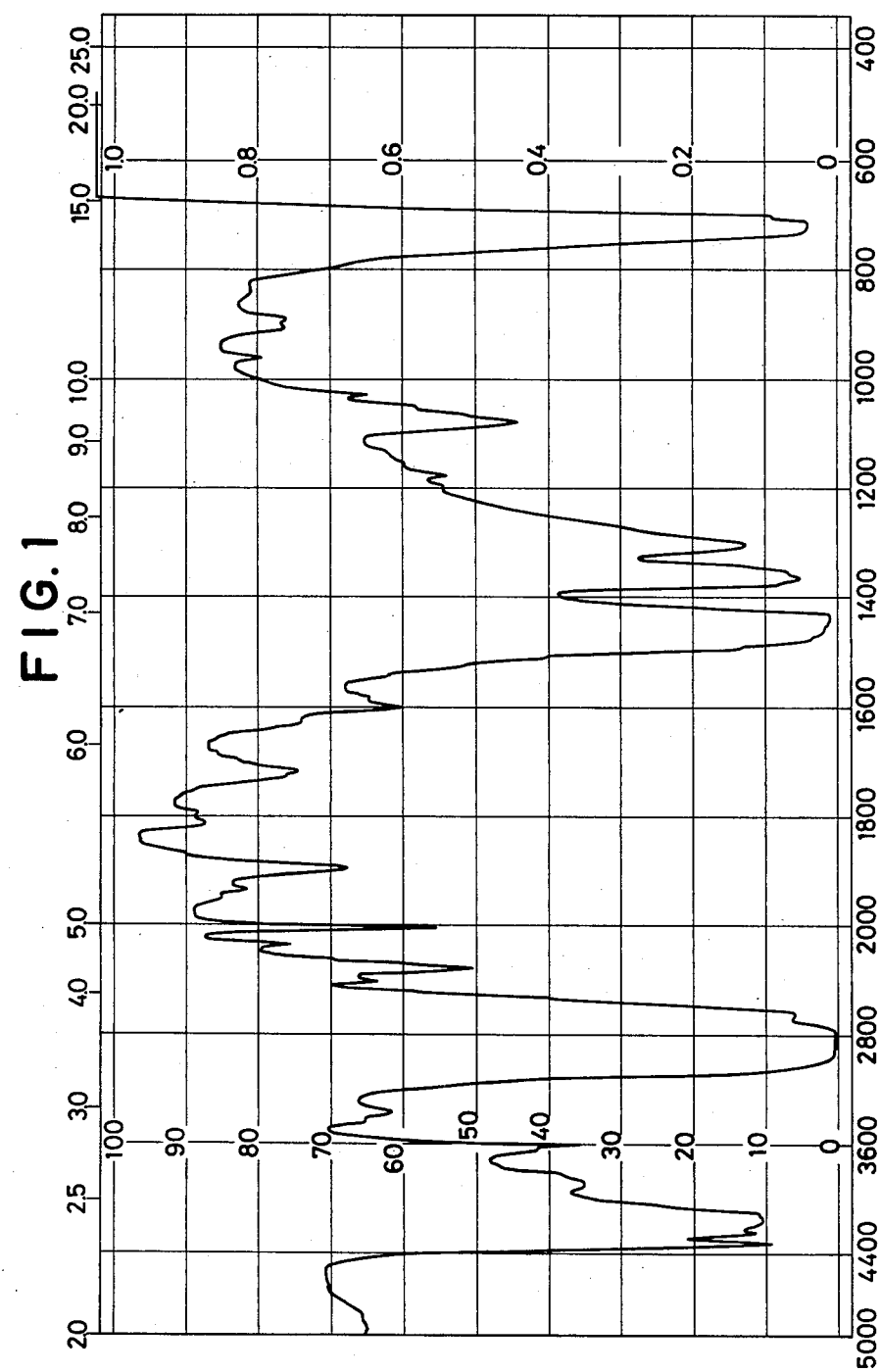
FIGS. 1 and 2 show infrared spectra of ethylene copolymers which have been prepared in Examples 2 and 6 regarding the present invention.

The present invention is directed to a novel ethylene copolymer comprising 95.0 to 99.995 mol % of an ethylene unit, 0.005 to 2 mol % of a comonomer unit represented by the formula (I)

wherein Ar is

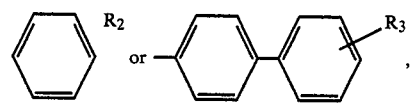

$R_1$ is an alkylene group 1 or 2 carbon atoms, each of $R_2$ and $R_3$ is a hydrogen atom, or a straight-chain or a side-chain alkyl group having 1 to 4 carbon atoms, and 0 to 3 mol % of an ethylenic unsaturated monomer unit, the novel ethylene copolymer having a density of 0.910 to 0.940 g/cm$^3$ and a melt index of 0.05 to 100 g/10 minutes.

The comonomer represented by the formula (I) can be at least one selected from the group consisting of allylbenzene, allyltoluene, allylethylbenzene, allylcumene, allyl-sec-butylbenzene, allylbiphenyl, allylmethylbiphenyl, allylethylbiphenyl, allyl-isopropylbiphenyl, allyl-sec-butylbiphenyl, 4-phenylbutene-1, 4-tolyl-butene-1, 4-ethylphenylbutene-1, 4-cumylbutene-1, 4-sec-butylphenylbutene-1 and 4-(3-butenyl)-biphenyl. Above all, allylbenzene, allylbiphenyl and 4-phenylbutene-1 are particularly preferred.

The content of the above-mentioned comonomer in the copolymer is within the range of 0.005 to 2 mol %, preferably 0.01 to 1.8 mol % in terms of the comonomer unit.

When the content of the comonomer is less than 0.005 mol %, modification effects of the ethylene copolymer will scarcely be perceived; when it is in excess of 2 mol %, the copolymer will be economically expensive and the consumption of radicals will be great, particulary in a high-pressure radical polymerization, so that the merit of industrially manufacturing it will be lost.

The ethylenic unsaturated monomer used in the present invention is at least one selected from the group consisting of olefins having 3 to 10 carbon atoms such as propylene, butene-1, hexene-1, 4-methylpentene-1, octene-1 and decene-1; styrene; vinyl esters of alkane carboxylic acids having 2 and 3 carbon atoms; acrylic and methacrylic esters such as methyl acrylate, methyl methacrylate, ethyl acrylate, ethyl methacrylate, propyl acrylate, propyl methacrylate, glycidyl acrylate and glycidyl methacrylate; ethylenic unsaturated carboxylic acids and their anhydrides such as acrylic acid, methacrylic acid, maleic acid, fumaric acid and maleic anhydride; and ethylenic unsaturated carboxylic acid amides such as acrylic acid amide, methacrylic acid amide, maleic acid amide and fumaric acid amide.

The content of the above ethylenic unsaturated monomer used in the present invention is within the range of 0 to 3 mol %, preferably 0 to 2 mol %.

The ethylene copolymer of the present invention can be manufactured by known methods such as anionic polymerization employing a Ziegler catalyst or a radical polymerization under a high pressure, but in the case that the copolymer for electrical insulating materials is manufactured, the radical polymerization is preferably because there is less catalyst residue.

The above-mentioned radical polymerization under a high pressure means method of polymerizing the monomers at once or stepwise under conditions of a polymerization pressure of 500 to 4,000 kg/cm$^2$, preferably 1,000 to 3,500 kg/cm$^2$ and a reaction temperature of 130° to 400° C., preferably to 350° C. in the presence of a free-radical initiator, a chain transfer agent, and if necessary, an auxiliary in an autoclave or a tube type reactor.

Examples of the above-mentioned free-radical initiators include usual initiators such as peroxides, hydroperoxides, azo compounds, amine oxides and oxygen.

Further, examples of the chain transfer agents include hydrogen, propylene, butene-1; saturated aliphatic hydrocarbons and halogen-substituted hydrocarbons having 1 to 20 carbon atoms or more such as methane, ethane, propane, butane, isobutane, n-hexane, n-heptane, cycloparaffins, chloroform and carbon tetrachloride; saturated aliphatic alcohols having 1 to 20 carbon atoms or more such as methanol, ethanol, propanol and isopropanol; saturated aliphatic carbonyl compounds such as carbon dioxide, acetone and methyl ethyl ketone; and aromatic compounds such as toluene, diethylbenzene and xylene.

In the ethylene copolymer for electrical insulating materials manufactured by the high-pressure radical polymerization method, there occurs less tree phenomenon than by the ionic polymerization, the tree phenomenon being caused by foreign matter contamination such as catalyst residues. Therefore, the thus prepared copolymers can have remarkably improved insulating power.

The ethylene copolymer of the present invention may be mixed, for various uses, with at least one of thermoplastic resins such as olefin polymers (inclusive of copolymers) other than the ethylene copolymers of the present invention, polyacrylonitriles, polyamides, polycarbonates, ABS resins, polystyrenes, polyphenylene oxides, polyvinyl alcohol resins, vinyl chloride resins, vinylidene chloride resins and polyester resins; thermosetting resins such as petroleum resins, coumarone-indene resins, phenolic resins and melamine resins; and synthetic and natural rubbers such as ethylene-propylene copolymer rubbers (EPR, EPDM and the like), SBR, NBR, butadiene rubbers, IIR, chloroprene rubbers, isoprene rubbers and styrene-butadiene-styrene block copolymers.

In the present invention, there may be used, without any problem, an organic or an inorganic filler, an antioxidant, a lubricant, an organic or an inorganic pigment, an ultraviolet screening agent, an antistatic agent, a dispersant, a copper deactivator, a neutralizer, a foaming agent, a plasticizer, an anti-foaming agent, a flame-retardant, a crosslinking agent, an improver for flow, an improver for weld strength and a nucleating agent.

EXAMPLE 1 to 11

In each example, the atmosphere in a 3.8-liter metallic autoclave reactor equipped with a stirrer was sufficiently replaced with nitrogen and ethylene, and a predetermined amount of ethylene, n-hexane, which was a chain transfer agent, and each comonomer were then placed in the reactor. Afterward, di-tertiary-butyl peroxide which was a polymerization initiator was poured thereinto, and polymerization was carried out at a temperature of 170° C. for one hour under polymerization conditions shown in Table 1.

A portion of the resultant polymer was dissolved in heated carbon tetrachloride and then was added to a large amount of acetone in order to deposit it again. This procedure was repeated several times to purify the polymer, followed by vacuum drying.

Figure 2:
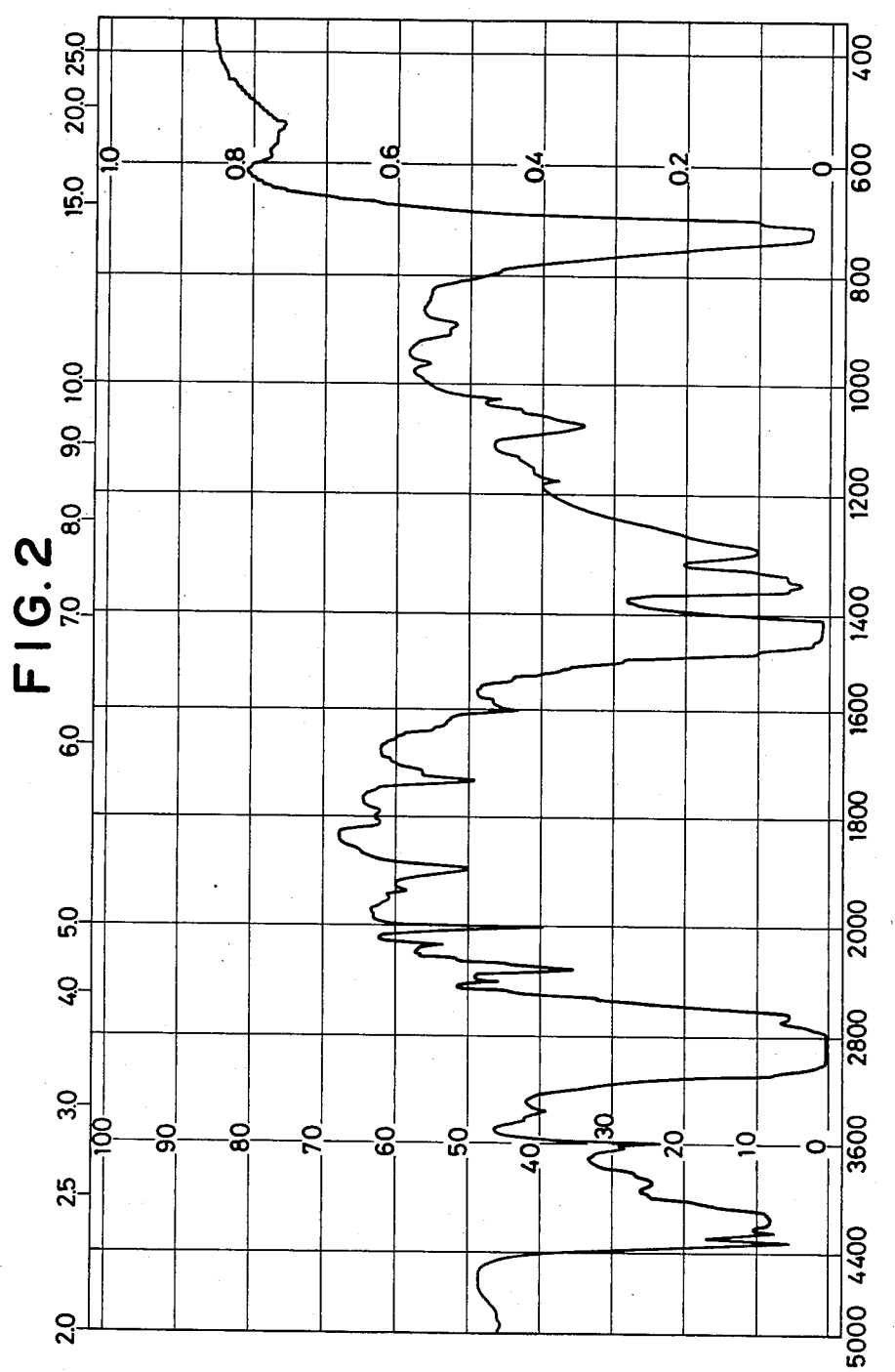

Each purified and dried polymer was molded into a sheet having a thickness of about 500 μm by means of heating compression. The ethylene copolymer of the present invention was confirmed from absorbencies based on aromatic rings at 1600, 700, 1030, 1790 and 1940 cm$^{-1}$ with the aid of infrared spectra. FIGS. 1 and 2 show infrared spectra obtained in Examples 2 and 6. The content of each copolymerized comonomer in the polymer was quantitatively analyzed on the basis of an absorbency at 1600 cm$^{-1}$, and the results are shown in Table 1. Further, the melt index and the density of each produced polymer were measured in accordance with JIS K 6760.

TABLE 1

| | | Polymerization Conditions | | | | |
|---|---|---|---|---|---|---|
| Example | Ethylene (g) | Comonomer Name | (g) | n-Hexane (g) | Di-t-butyl peroxide (mg) | Pressure (kg/cm$^2$) |
| 1 | 1,680 | Allylbenzene | 10 | 260 | 82 | 1,590 |
| 2 | 1,790 | Allylbenzene | 30 | 90 | 320 | 1,610 |
| 3 | 1,690 | 4-Phenylbutene-1 | 100 | 30 | 960 | 1,600 |
| 4 | 1,680 | 4-Phenylbutene-1 | 10 | 260 | 16 | 1,600 |
| 5 | 1,710 | 4-Phenylbutene-1 | 20 | 220 | 25 | 1,570 |
| 6 | 1,700 | 4-Phenylbutene-1 | 30 | 240 | 16 | 1,610 |
| 7 | 1,680 | Allylbiphenyl | 200 | 70 | 96 | 1,610 |
| 8 | 1,730 | Allylbiphenyl | 10 | 260 | 6 | 1,710 |
| 9 | 1,750 | Allylbiphenyl | 30 | 280 | 49 | 1,780 |
| 10 | 1,680 | Allyltoluene | 10 | 260 | 82 | 1,600 |
| 11 | 1,690 | Ally-sec-butylbenzene | 10 | 240 | 82 | 1,610 |

| | Produced Polymer | | | |
|---|---|---|---|---|
| Example | Yield (g) | Melt Index (g/10 min) | Density (g/cm$^3$) | Content of Comonomer (mol %) |
| 1 | 130 | 5.0 | 0.929 | 0.08 |
| 2 | 130 | 1.4 | 0.929 | 0.21 |
| 3 | 100 | 6.2 | 0.930 | 0.75 |

TABLE 1-continued

| 4 | 240 | 1.6 | 0.929 | 0.07 |
| 5 | 210 | 1.5 | 0.929 | 0.14 |
| 6 | 120 | 9.2 | 0.928 | 0.25 |
| 7 | 110 | 4.3 | 0.930 | 1.6 |
| 8 | 90 | 1.7 | 0.930 | 0.01 |
| 9 | 40 | 9.7 | 0.930 | 0.06 |
| 10 | 110 | 12.9 | 0.929 | 0.05 |
| 11 | 90 | 10.1 | 0.929 | 0.03 |

EXAMPLE 12

The same equipment as in Example 1 was used, and 1,680 g of ethylene, 20 g of allylbenzene as a comonomer, 85 g of vinyl acetate as an ethylenic unsaturated monomer and a chain transfer agent (n-hexane) were placed in the reactor. Afterward, a polymerization initiator (ditertiary butyl peroxide) was further poured thereinto, and polymerization was carried out at a temperature of 170° C. at a pressure of 1,600 kg/cm² for one hour. The resultant polymer was treated and analyzed in the same manner as in Example 1, and the results are set forth in Table 2.

The content of vinyl acetate in the copolymer was quantitatively analyzed by first molding it into a sheet having a thickness of about 30 μm, taking its infrared absorption spectrum, and measuring its content on the basis of an absorbency of the absorption peak at 1,022 cm$^{-1}$.

EXAMPLE 13

The same equipment as in Example 1 was used, and 1,820 g of ethylene, 20 g of allylbenzene as a comonomer, 30 g of ethyl acrylate as an ethylenic unsaturated monomer and a chain transfer agent (n-hexane) were placed in the reactor. Afterward, a polymerization initiator (di-tertiary-butyl peroxide) was further poured thereinto, and polymerization was carried out at a temperature of 170° C. at a pressure of 1,590 kg/cm² for one hour. The resultant polymer was treated and analyzed in the same manner as in Example 1, and the results are set forth in Table 2.

The content of ethyl acrylate in the copolymer was quantitatively analyzed by first molding it into a sheet having a thickness of about 200 μm, taking its infrared absorption spectrum, and measuring its content on the basis of an absorbency of the absorption peak at 860 cm$^{-1}$.

TABLE 2

| | | Polymerization Conditions | | | | | |
|---|---|---|---|---|---|---|---|
| Example | Ethylene (g) | Comonomer Name | (g) | Ethylenic unsaturated monomer Name | (g) | n-Hexane (g) | Di-t-butyl peroxide (mg) |
| 12 | 1,680 | Allylbenzene | 20 | Vinyl acetate | 85 | 120 | 204 |
| 13 | 1,820 | Allylbenzene | 20 | Ethyl acrylate | 30 | 100 | 204 |

| | | Produced Polymer | | | |
|---|---|---|---|---|---|
| | | | | Content (mol %) | |
| Example | Yield (g) | Melt Index (g/10 min) | Density (g/cm³) | Comonomer | Ethylenic unsaturated monomer |
| 12 | 180 | 3.5 | 0.935 | Allylbenzene 0.14 | Vinyl acetate 1.5 |
| 13 | 170 | 9.1 | 0.934 | Allylbenzene 0.13 | Ethyl acrylate 3.0 |

Moreover, for the copolymers of the present invention prepared in the above-mentioned examples, insulating destructive strength (impulse voltage destructive strength) was measured, and the results are set forth in Table 3. It is apparent from the given results that in the copolymers of the present invention, the insulating destructive strength could be improved remarkably.

This measurement of the insulating destructive strength was carried out as follows:

Procedure: As an electrode system, there was used a pair of stationary electrodes in which a stainless steel ball of ½ inch in diameter was utilized, i.e., the so-called Mckeown electrode. The electrode system was entirely dipped into silicone oil and was then placed in a thermostat at a temperature of 80° C. An impulse voltage was applied to between the electrodes and was then raised gradually, and the point of breakage was taken as the value of insulating destructive strength (impulse voltage destruction strength).

Sample 1: Ethylene-allylbenzene copolymer (sample of Example 1)
Sample 2: Ethylene-allylbiphenyl copolymer (sample of Example 8)
Sample 3: Ethyl homopolymer (density=0.929 g/cm³, MI=2.4 g/10 min; ethylene alone was polymerized under the same conditions as in Example 1)

TABLE 3

| Sample | Impulse voltage destructive strength (80° C.) (MV/cm) |
|---|---|
| 1 | 4.1 |
| 2 | 4.3 |
| 3 | 3.5 |

What is claimed is:

1. A novel ethylene copolymer obtained by a high-pressure radical polymerization at a pressure of 500 to 4,000 kg/cm² at a temperature of 130° to 400° C. and which comprises 95.0 to 99.995 mol % of an ethylene unit, 0.005 to 2 mol % of a comonomer unit represented by the formula (I)

$$\begin{array}{c} H \\ \diagdown \\ / \\ H \end{array} C = \begin{array}{c} H \\ | \\ \end{array} C - R_1 - Ar \qquad (I)$$

wherein Ar is

 or 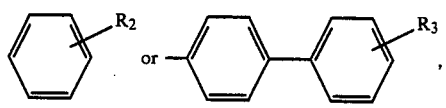, $R_1$ is an alkylene group having 1 or 2 carbon atoms, each of $R_2$ and $R_3$ is a hydrogen atom, or a straight-chain or a side-chain alkyl group having 1 to 4 carbon atoms, and 0 to 3 mol % of an ethylenic unsaturated monomer unit, said ethylene copolymer having a density of 0.910 to 0.940 g/cm³ and a melt index of 0.05 to 100 g/10 minutes.

2. A new ethylene copolymer according to claim 1 wherein said comonomer represented by said formula (I) is at least one compound selected from the group consisting of allylbenzene, allylbiphenyl and 4-phenyl-butene-1.

3. A new ethylene copolymer according to claim 2 containing 0 to 2 mol % of said ethylenic unsaturated monomer unit and wherein said pressure is 1000 to 3500 kg/cm$^2$ and said temperature is 130° to 350° C.

4. A new ethylene copolymer according to claim 3 in which said ethylenic unsaturated monomer is vinyl acetate or ethyl acrylate.

5. A new ethylene copolymer according to claim 1 containing 0 to 2 mol % of said ethylenic unsaturated monomer unit and wherein said pressure is 1000 to 3500 kg/cm$^2$ and said temperature is 130° to 350° C.

6. A new ethylene copolymer according to claim 5 in which said ethylenic unsaturated monomer is vinyl acetate or ethyl acrylate.

7. A new ethylene copolymer according to claim 1 containing 0.01 to 1.8 mol % of said comonomer unit.

* * * * *